United States Patent
Olofsson et al.

(10) Patent No.: US 11,270,544 B2
(45) Date of Patent: Mar. 8, 2022

(54) ACCESS CONTROL FOR ACCESS RESTRICTED DOMAINS USING FIRST AND SECOND BIOMETRIC DATA

(71) Applicant: FINGERPRINT CARDS AB, Gothenburg (SE)

(72) Inventors: Olis Olofsson, Malmö (SE); Peter Almers, Limhamn (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/605,062

(22) PCT Filed: Apr. 18, 2018

(86) PCT No.: PCT/SE2018/050393
§ 371 (c)(1),
(2) Date: Oct. 14, 2019

(87) PCT Pub. No.: WO2018/194507
PCT Pub. Date: Oct. 25, 2018

(65) Prior Publication Data
US 2021/0134099 A1  May 6, 2021

(30) Foreign Application Priority Data

Apr. 20, 2017 (SE) .................... 1750461-4

(51) Int. Cl.
*G07C 9/37* (2020.01)
*G06K 9/00* (2006.01)
*G07C 9/38* (2020.01)

(52) U.S. Cl.
CPC ........... *G07C 9/37* (2020.01); *G06K 9/00087* (2013.01); *G06K 9/00288* (2013.01);
(Continued)

(58) Field of Classification Search
CPC ........ G07C 9/37; G07C 9/38; G06K 9/00087; G06K 9/00288; G06K 9/00369; G06K 9/00617; G06K 9/00892
See application file for complete search history.

(56) References Cited

U.S. PATENT DOCUMENTS 8,260,262 B2 *  9/2012  Ben Ayed .......... G08B 13/1436
                                                          455/411
8,922,342 B1  12/2014  Ashenfelter et al.
(Continued)

FOREIGN PATENT DOCUMENTS

CN      101038683 A     9/2007
CN      101256628 A     9/2008
(Continued)

OTHER PUBLICATIONS

Extended European Search Report dated Nov. 27, 2020 for European Patent Application No. 18788579.3, 8 pages.
(Continued)

*Primary Examiner* — Thomas D Alunkal
(74) *Attorney, Agent, or Firm* — RMCK Law Group, PLC

(57) ABSTRACT

A method for granting access for a user to a domain which is subject to an access restriction, wherein the user belongs to a group of one or more user shaving an access privilege in relation to the domain. The method comprises acquiring a first set of biometric data associated with the user. A first identification is successful if a comparison of the first set of biometric data to previously acquired data relating to the user, or to the group of users, indicates that the user belongs to the group. The method also comprises acquiring a second set of biometric data associated with the user responsive to the first identification being successful. A second identification is successful if a comparison of the second set of (Continued)

biometric data to previously acquired data relating to the user indicates that the user has the access privilege.

20 Claims, 3 Drawing Sheets

(52) U.S. Cl.
CPC ..... G06K 9/00369 (2013.01); G06K 9/00617 (2013.01); G06K 9/00892 (2013.01); G07C 9/38 (2020.01)

(56) References Cited

U.S. PATENT DOCUMENTS

| | | | |
|---|---|---|---|
| 9,230,152 B2* | 1/2016 | Boshra | G06K 9/00026 |
| 2002/0194003 A1 | 12/2002 | Mozer | |
| 2003/0123713 A1* | 7/2003 | Geng | G06K 9/00288 |
| | | | 382/118 |
| 2006/0072791 A1 | 4/2006 | Gutta et al. | |
| 2006/0210119 A1 | 9/2006 | Willis et al. | |
| 2007/0217659 A1 | 9/2007 | Harada | |
| 2008/0211627 A1* | 9/2008 | Shinzaki | G06K 9/00892 |
| | | | 340/5.82 |
| 2009/0282258 A1* | 11/2009 | Burke | G06F 21/46 |
| | | | 713/184 |
| 2013/0081119 A1 | 3/2013 | Sampas | |
| 2013/0227651 A1 | 8/2013 | Schultz et al. | |
| 2014/0347161 A1 | 11/2014 | Sheu | |
| 2014/0347479 A1* | 11/2014 | Givon | H04N 21/4415 |
| | | | 348/143 |
| 2015/0067822 A1* | 3/2015 | Randall | G06F 21/32 |
| | | | 726/17 |
| 2016/0162671 A1 | 6/2016 | Baca et al. | |
| 2017/0193723 A1* | 7/2017 | Park | E05B 49/00 |

FOREIGN PATENT DOCUMENTS

| | | |
|---|---|---|
| CN | 201207195 Y | 3/2009 |
| CN | 201838011 U | 5/2011 |
| CN | 204659664 U | 9/2015 |
| CN | 204833296 U | 12/2015 |
| CN | 105374098 A | 3/2016 |

OTHER PUBLICATIONS

Ross, A. et al., "Information fusion in biometrics," Pattern Recognition Letters 24 (2003), pp. 2115-2125.

PCT International Search Report and Written Opinion dated Jun. 21, 2018 for International Application No. PCT/SE2018/050393, 11 pages.

* cited by examiner

ACCESS CONTROL FOR ACCESS RESTRICTED DOMAINS USING FIRST AND SECOND BIOMETRIC DATA

CROSS-REFERENCE TO RELATED APPLICATIONS

This application is a 371 U.S. National Stage of International Application No. PCT/SE2018/050393, filed Apr. 18, 2018, which claims priority to Swedish Patent Application No. 1750461-4, filed Apr. 20, 2017. The disclosures of each of the above applications are incorporated herein by reference in their entirety.

TECHNICAL FIELD

The present disclosure relates generally to the field of controlling access to domains subject to access restriction. More particularly, it relates to use of biometric data to determine whether to grant or deny such access.

BACKGROUND

A current trend in access control (e.g. unlocking of a door or logging in to a computer system) that it becomes increasingly common to base the access decision on biometric data. As in all access control applications, security is important when using biometric data. Security in an access control system (or access granting system) may, typically, be evaluated in terms of a false acceptance rate (FAR), wherein a low FAR indicates high security.

Examples of access control using biometric data are disclosed in CN105374098A and CN204659664U. CN105374098A discloses a two-stage identification method for unlocking using human body double-characteristic identification, wherein a finger is put on a fingerprint reader and (when the fingerprint is identified to be right) the face is turned to a camera used for human face identification. Unlocking of the lock is realized when the face is identified to be right. CN204659664U discloses a two-stage biological identification function, wherein a fingerprint sensor causes generation of an unblock radio signal for reception at a door of a car. A door unblock signal is connected through wire to a face recognition module in turn connected with an engine starting circuit fingerprint identification module.

The security requirements may vary substantially between different restriction applications. Some restriction applications (e.g. un-locking of a screen, small amount payments, etc.) may only require a low level of security while other restriction applications (e.g. domestic entrance, large amount payments, etc.) may require a high level of security. In this respect, an approach which is scalable with regard to the applicable security level would be beneficial.

Typically, a very secure system requires more complex procedures (e.g. in terms of number and complexity of user interaction, delay, etc.) which may leads to unsatisfactory user experience. Furthermore, a low FAR may entail a high false rejection rate (FRR), which may also lead to unsatisfactory user experience for users with access to the access restricted domain.

Therefore, there is a need for alternative approaches to access control for domains subject to an access restriction. Preferably, such approaches should be able to provide high security while not increasing (or at least minimizing the increased) user inconvenience. Also preferably, such approaches should be scalable with regard to the applicable security level.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method for granting access for a user to a domain which is subject to an access restriction, wherein the user belongs to a group of one or more users having an access privilege in relation to the domain.

The method comprises acquiring (via one or more first biometric readers) a first set of biometric data associated with the user, exclusively responsive to the user being in a vicinity of at least one of the first biometric readers, and performing a first identification of the user based on the first set of biometric data. The first identification is successful if a comparison of the first set of biometric data to previously acquired first biometric data relating to the user, or to the group of users, indicates that the user belongs to the group.

The method also comprises acquiring (via one or more second biometric readers) a second set of biometric data associated with the user responsive to the first identification being successful, and performing a second identification of the user based on the second set of biometric data. The second identification is successful if a comparison of the second set of biometric data to previously acquired second biometric data relating to the user indicates that the user has the access privilege.

The method comprises granting access for the user to the domain at least responsive to the second identification being successful.

In some embodiments, granting access may comprise enabling access. For example, granting access may comprise generating an access grant signal for reception by an access restriction device (e.g. a lock), wherein the access grant signal is adapted to cause disabling of the access restriction device.

In some embodiments, the method may further comprise denying access for the user to the domain responsive to one or more of: the first identification being unsuccessful and the second identification being unsuccessful.

In some embodiments, the acquiring of first and second sets of biometric data and the performance of first and second identifications may be expanded to successively acquiring a plurality of sets of biometric data and performing a plurality of respective identifications.

According to some embodiments, each of the first and second identifications has an individual security level which may be the same or different, while a joint security level of the first and second identifications exceeds the individual security level of the first (and the second) identification. If a plurality of successive identifications is applied, the joint security level typically increases for each succession. In some embodiments, the individual security level may also increase (decreasing FAR) for each successive identification.

The method may, for example, be performed by a server node for an access control system.

In some embodiments, the domain may be a physical domain (e.g. related to a physical lock for any type of door in relation to a house, a room, a car, etc.). Alternatively or additionally, the domain may be a virtual domain (e.g. related to a password protection for any type of computer system, file, data, etc.) according to some embodiments.

The biometric data may, typically, be associated with biometric identifiers. Biometric identifiers may, typically, be categorized into physiological characteristics and behavioral characteristics. Physiological characteristics may be related to a shape or other characteristics associated with the body of a user. Examples include (but are not limited to) fingerprints, palm veins, face recognition, DNA, palm prints, hand geometry, iris recognition, retina and odor/scent. Recognition of wearable and/or implantable devices may also be comprised in the physical characteristics category, as well as liveness recognition. Behavioral characteristics may be related to a pattern of behavior of a user. Examples include (but are not limited to) gait, gesture and voice.

The first biometric data may, for example, comprise one or more of facial features, body features, motion features and gesture features. The second biometric data may, for example, comprise one or more of fingerprint features, iris features and body area network features. Biometric data relating to the user may, for example, comprise any individual facial or body features, gesture, gait, fingerprint, iris pattern, etc. Biometric data relating to the group of users may comprise features common to the group of users (e.g. recognizing gender, recognizing human features as opposed to (other) animal features or other movements, general liveness recognition such as presence of pulse, etc.). Generally, biometric data may relate to any suitable physiological or behavioral characteristics. The previously acquired biometric data may, for example, be initially acquired and stored in a database. Alternatively or additionally, the previously acquired biometric data may be acquired via training of the system in relation to the user or group of users and the database may be updated accordingly.

Vicinity may be defined in terms of one or more of: absolute distance between the user and the first biometric reader (e.g. the absolute distance being lower than a vicinity threshold), direction from the first biometric reader (e.g. the user being within a certain angular range in relation to the first biometric reader), resolution of the biometric data (e.g. the resolution of an image of the user collectable by the first biometric reader being above a resolution threshold).

In some embodiments, the first set of biometric data (including a result of the comparison of the first set of biometric data to previously acquired first biometric data) may be used in the comparison of the second set of biometric data to previously acquired second biometric data. All references herein to the second set of biometric data are equally applicable to, and meant to encompass, combinations of the first and second sets of biometric data. Such approaches may expedite the second comparison in terms of time and/or accuracy. For example metrics relating to the first and second sets of biometric data may be combined (using soft or hard combining).

According to some embodiments, the comparison of the second set of biometric data to the previously acquired second biometric data may comprise combining the second set of biometric data with the first set of biometric data and comparing the combined set of biometric data to the previously acquired second biometric data.

Alternatively or additionally, metrics relating to the first comparison may be used to limit the scope of the second comparison and/or to simplify searching of the previously acquired second biometric data. This may speed up the second step of identification.

According to some embodiments, the first identification is unsuccessful if a comparison of the first set of biometric data to the previously acquired first biometric data does not indicate that the user belongs to the group (or indicates that the user does not belong to the group).

According to some embodiments, the second identification is unsuccessful if a comparison of the second set of biometric data to the previously acquired second biometric data does not indicate that the user has the access privilege (or indicates that the user does not has the access privilege).

That the acquiring of the first set of biometric data is exclusively responsive to the user being in a vicinity of at least one of the first biometric readers may be defined as there is no further user interaction needed than being in the vicinity.

According to some embodiments, acquiring the first set of biometric data may be automatically performed responsive to a determination that the user is in the vicinity of the at least one of the first biometric readers. The determination that the user is in the vicinity of the first biometric reader may comprise detecting that the user is in the vicinity of the first biometric reader, the acquiring step being responsive to the detection.

Acquiring the second set of biometric data may, according to some embodiments, comprise activating the one or more second biometric readers responsive to the first identification being successful. Such activation may, for example, comprise enabling (physical and/or virtual) access to the one or more second biometric reader and/or initiating the acquiring of the second set of biometric data.

According to some embodiments, acquiring the second set of biometric data may be further responsive to the user actively providing the second set of biometric data (e.g. by adequately touching one of the first biometric readers).

Typically, the one or more first biometric readers may comprise one or more non-contact based biometric readers (although contact based biometric readers are not excluded). For example, the one or more first biometric readers may, according to some embodiments, comprise one or more image capturing devices and circuitry configured to perform recognition of the first biometric data comprised in captures images (or image sequences).

Typically, the one or more first biometric readers may comprise one or more contact or non-contact based biometric readers. A non-contact based biometric reader may, in this context, be vicinity based wherein the vicinity is more restrictive than the vicinity described above for the first biometric reader(s). For example, the one or more second biometric readers may comprise one or more of a fingerprint scanner, an iris scanner, and a body area network sensor.

In some embodiments, the previously acquired first biometric data may be exclusively associated with the group of users. In such embodiments, the first comparison cannot identify the user on an individual level.

According to some embodiments, the comparison of the first set of biometric data to the previously acquired first biometric data may indicate that the user belongs to the group if the first set of biometric data matches the previously acquired first biometric data for any of the users of the group. The comparison may indicate that the user does not belong to the group if the first set of biometric data does not match the previously acquired first biometric data for any of the users of the group.

In some embodiments, the previously acquired second biometric data may be associated with respective user in the group of users.

According to some embodiments, the comparison of the second set of biometric data to the previously acquired second biometric data may indicate that the user has the access privilege if the second set of biometric data matches the previously acquired second biometric data for any of the users of the group. The comparison may indicate that the user does not have the access privilege if the second set of biometric data does not match the previously acquired second biometric data for any of the users of the group.

A second aspect is a computer program product comprising a computer readable medium, having thereon a computer program comprising program instructions. The computer program is loadable into a data processing unit and configured to cause execution of the method according to the first aspect when the computer program is run by the data processing unit.

A third aspect is an arrangement for granting access for a user to a domain which is subject to an access restriction, wherein the user belongs to a group of one or more users having an access privilege in relation to the domain.

The arrangement comprises a controller configured to cause acquiring (via one or more first biometric readers) of a first set of biometric data associated with the user, exclusively responsive to the user being in a vicinity of at least one of the first biometric readers, and performing of a first identification of the user based on the first set of biometric data. The first identification is successful if a comparison of the first set of biometric data to previously acquired first biometric data relating to the user, or to the group of users, indicates that the user belongs to the group.

The controller is also configured to cause acquiring (via one or more second biometric readers) of a second set of biometric data associated with the user responsive to the first identification being successful, and performing of a second identification of the user based on the second set of biometric data. The second identification is successful if a comparison of the second set of biometric data to previously acquired second biometric data relating to the user indicates that the user has the access privilege.

A fourth aspect is a server node for granting access for a user to a domain which is subject to an access restriction comprising the arrangement of the third aspect.

A fifth aspect is an access control system configured to grant access for a user to a domain which is subject to an access restriction. The system comprises the server node of the fourth aspect, the one or more first biometric readers, the one or more second biometric readers, and data storage configured to comprise the previously acquired first biometric data and the previously acquired second biometric data.

In some embodiments, the data storage may be configured to comprise the previously acquired first biometric data exclusively associated with the group of users and the previously acquired second biometric data associated with respective user in the group of users.

In some embodiments, any of the above aspects may additionally have features identical with or corresponding to any of the various features as explained above for any of the other aspects.

An advantage of some embodiments is that increased security (decreased FAR) may be provided compared to single step identification. For example, this may reduce the hesitance towards using a biometric access system of potential users.

Another advantage of some embodiments is that the inconvenience to the user is not different from an approach where only the second identification step is applied.

Yet an advantage of some embodiments is that restrictions regarding image capturing in public places may be circumvented when the first identification step only relates to determining whether or not a user belongs to the group of users.

A further advantage of some embodiments is that scalability with regard to the applicable security level is provided. In some embodiments, such scalability is provided by using a combination of different sets of biometric data (possibly combined with other input such as personal identification number—PIN—code, etc.), which may be associated with different levels of FAR and/or FRR.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where access grant is based on a plurality of two or more steps of biometric data acquiring and associated identification.

In a typical example, the first step identifies if the user belongs to a group that has access privileges, and the second step identifies the user on an individual level (authentication). In such an approach the first step is anonymous, while the second step is accurate.

Also typically, the first step comprises an ambient identification and the second step comprises a user active authentication.

Example application areas include (but are not limited to) door lock systems, PC login, and IoT (Internet of Things) products.

Figure 1:
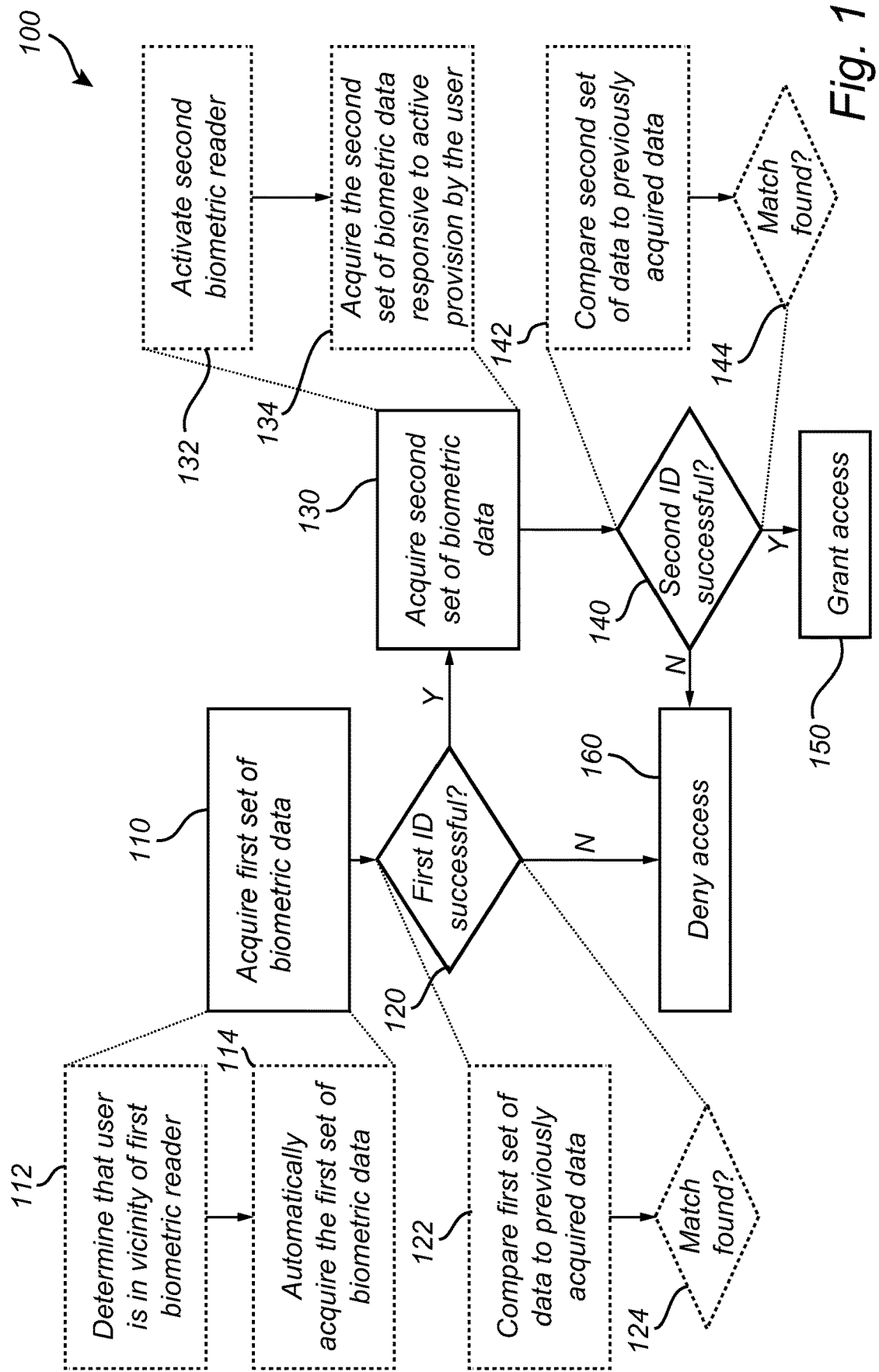
FIG. 1 is a flowchart illustrating example method steps according to some embodiments.

FIG. 1 illustrates an example method 100 according to some embodiments. The method 100 is for granting access for a user to a domain which is subject to an access restriction, wherein the user belongs to a group of one or more users having an access privilege in relation to the domain.

The method starts in step 110 where a first set of biometric data associated with the user is acquired via one or more first biometric readers. The acquiring of step 110 is exclusively responsive to the user being in a vicinity of at least one of the first biometric readers. As illustrated by optional sub-steps 112 and 114, this may comprise determining that the user is in vicinity of one of the first biometric readers and (responsive to the determination) automatically acquiring the first set of biometric data. An example of operations in relation to step 110 is a motion detector (one of the first biometric readers) registering motion and triggering a camera (one of the first biometric readers) to capture an image which is processed for extracting facial features (a first set of biometric data). Other examples of first sets of biometric data comprise body features, motion features and gesture features.

In step 120, the method performs a first identification (ID) of the user based on the first set of biometric data. As illustrated by optional sub-steps 122 and 124, the identification may comprise comparing the first set of biometric data to previously acquired biometric data relating to the user and/or to the group of users, and determining whether or not a match is found. The first identification may be considered successful if the comparison indicates that the user belongs to the group and unsuccessful otherwise. An example of operations in relation to step 120 is a comparison of extracted facial features to either or both of facial features relating to all of the users of the group and a bank of facial features for each of the users in the group.

If the first identification is unsuccessful (N-path out from step 120), the method continues to step 160, where access is denied. If the first identification is successful (Y-path out from step 120), the method continues to step 130.

In step 110, a second set of biometric data associated with the user is acquired via one or more second biometric readers. The acquiring of step 130 is, thus, responsive to the first identification being successful. As illustrated by optional sub-steps 132 and 134, this may comprise (physically and/or virtually) activating the second biometric reader(s) and acquiring the second set of biometric data responsive to the user actively providing the data. An example of operations in relation to step 110 is a fingerprint scanner (second biometric reader) being physically exposed and made ready to scan (step 132) and a fingerprint (a second set of biometric data) being scanned when the user positions a finger on the scanner (step 133). Other examples of second sets of biometric data comprise iris features and body area network features.

In step 140, the method performs a second identification (ID) of the user based on the second set of biometric data. As illustrated by optional sub-steps 142 and 144, the identification may comprise comparing the second set of biometric data to previously acquired biometric data relating to the user, and determining whether or not a match is found. The second identification may be considered successful if the comparison indicates that the user has access privileges and unsuccessful otherwise. An example of operations in relation to step 140 is a comparison of acquired fingerprint features to a bank of fingerprint features for each of the users in the group.

If the second identification is unsuccessful (N-path out from step 140), the method continues to step 160, where access is denied. If the second identification is successful (Y-path out from step 140), the method continues to step 150 where access is granted.

In a typical example, two different biometric identifications are used for authenticating a user. The purpose of the first identification may be that the user gets access to the second identification (e.g. via activation/exposure/etc. of a fingerprint sensor). The purpose of the second identification may be to authenticate the user and granting access (e.g. unlocking a door lock).

The first identification may be ambient and automatic/passive (from the user perspective) and may identify the user only as being part of a group having access privileges (anonymous identification). The second identification may be (user) active and may identify the user on an individual level (authentication).

The concept described in connection to FIG. 1 may be generalized to any suitable number of identification levels. Further identification levels may, for example, use an approach similar to the first level (steps 110-120), an approach similar to the second level (steps 130-140), an approach which combines features of the first and second levels, or a different approach (e.g. based on non-biometric data sets, such as PIN codes). Furthermore, the further identification level(s) may be inserted before the first level (before step 110), after the second level (after step 140) or between the first and second levels (between steps 120 and 130). Furthermore, any level may additionally utilize the biometric data and or comparison result from any previous level(s) to improve identification (e.g. in terms of delay and/or accuracy). Such utilization may, for example, comprise (soft or hard) combining any suitable metrics from different levels.

According to some example applications, different levels may relate to different physical layers of access. In a first level may relate to a building entrance, a second level to a company entrance, a third level to a department entrance and a fourth level to a room entrance, where all levels utilize the result and/or data of previous levels.

Figure 2:
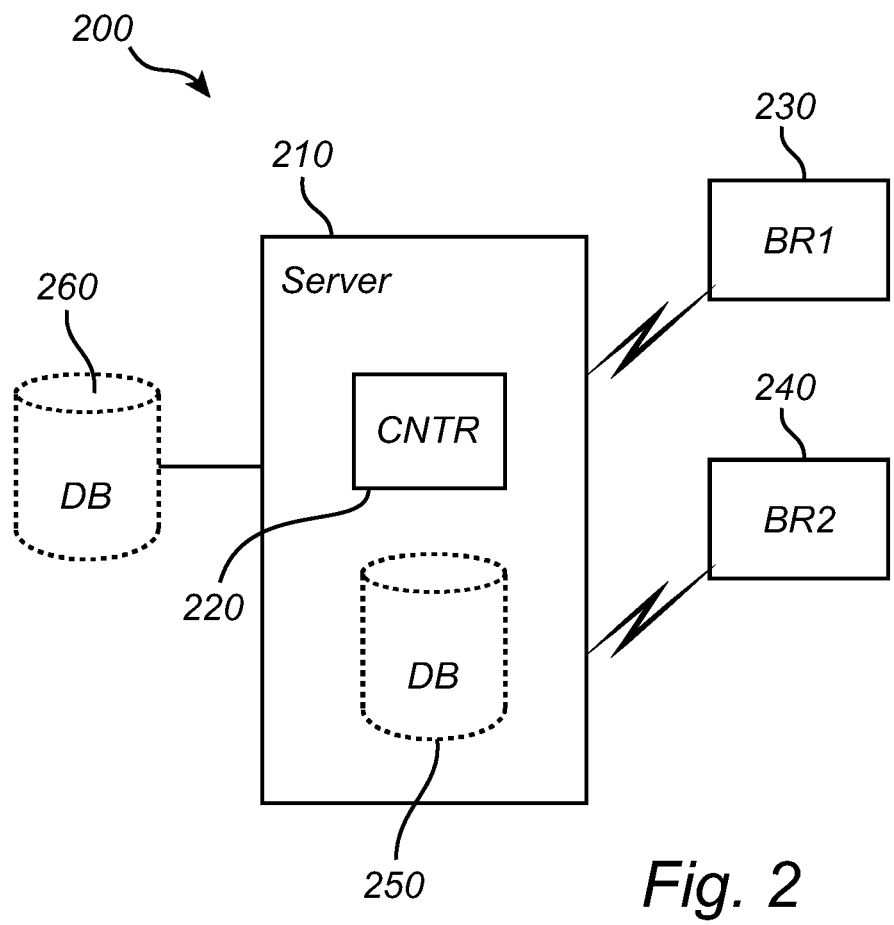
FIG. 2 is a schematic block diagram illustrating an example system according to some embodiments.

FIG. 2 schematically illustrates an example access control system 200 according to some embodiments. The access control system comprises a server node (SERVER) 210, one or more first biometric readers (BR1) 230, one or more second biometric readers (BR12) 240, and data storage (DB).

The biometric readers 230, 240 have virtual or physical connections to the server node. The biometric readers may comprise any suitable reader (e.g. cameras, face/body/gesture recognition circuitry, motion sensors, and scanners for fingerprint, palm print, iris, etc.). In some embodiments one or more of the biometric readers may be integrated with the user (e.g. body area network sensors).

The data storage is configured to comprise the previously acquired first biometric data and the previously acquired second biometric data. The data storage may be comprised in the server node as illustrated by 250 or may be external to the server node as illustrated by 260. Furthermore, the data storage may be distributed as two or more different storage entities according to some embodiments.

The access control system 200 may, for example, be configured to grant and deny access according to the method described in connection to FIG. 1. To this end, the server node 210 comprises a controller (CNTR) 220 adapted to cause performance of the method of FIG. 1.

Figure 3:
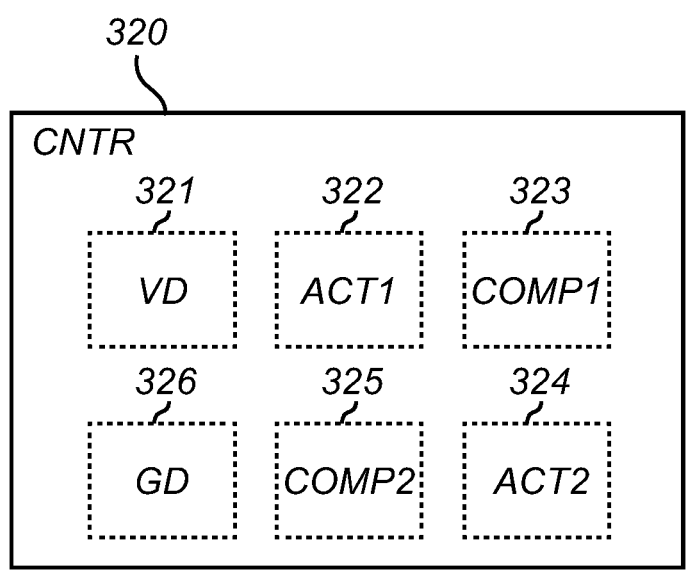
FIG. 3 is a schematic block diagram illustrating an example controller according to some embodiments.

FIG. 3 schematically illustrates an example controller 320 according to some embodiments, which controller may be used as the controller 220 of FIG. 2.

The controller 320 may, for example, comprise (or be otherwise associated with) a vicinity detector (VD) 321, first and second activators (ACT1, ACT2) 322, 324, first and second comparators/determiners/matchers (COMP1, COMP2) 323, 325 and grant/deny circuitry (GD) 326.

The controller 320 may be configured to cause acquiring (via the one or more first biometric readers 230), of a first set of biometric data associated with the user (compare with step 110 of FIG. 1). The acquiring is exclusively responsive to the user being in a vicinity of at least one of the first biometric readers. To this end, the vicinity detector 321 may be configured to detect the user being in the vicinity and the first activator 322 may be configured to activate the acquiring of the first set of biometric data in response thereto.

The controller 320 may also be configured to cause performing of a first identification of the user based on the first set of biometric data (compare with step 120 of FIG. 1). The identification may comprise a comparison (by the first comparator 323) of the first set of biometric data to previously acquired first biometric data as described above.

The controller 320 may be further configured to cause acquiring (via the one or more second biometric readers 240), of a second set of biometric data associated with the user (compare with step 130 of FIG. 1). The acquiring is responsive to the first identification being successful. To this end, the second activator 324 may be configured to activate the second biometric reader(s) in response thereto.

The controller 320 may also be configured to cause performing of a second identification of the user based on the second set of biometric data (compare with step 140 of FIG. 1). The identification may comprise a comparison (by the second comparator 325) of the second set of biometric data to previously acquired second biometric data as described above.

The controller 320 may be configured to cause granting of access responsive to the second identification being successful and denying of access otherwise as explained above (compare with steps 150 and 160 of FIG. 1). To this end, the grant/deny circuitry 326 may be configured to generate corresponding signals (e.g. a granting signal disabling a lock and a denial signal generating feedback to the user).

Figure 4:
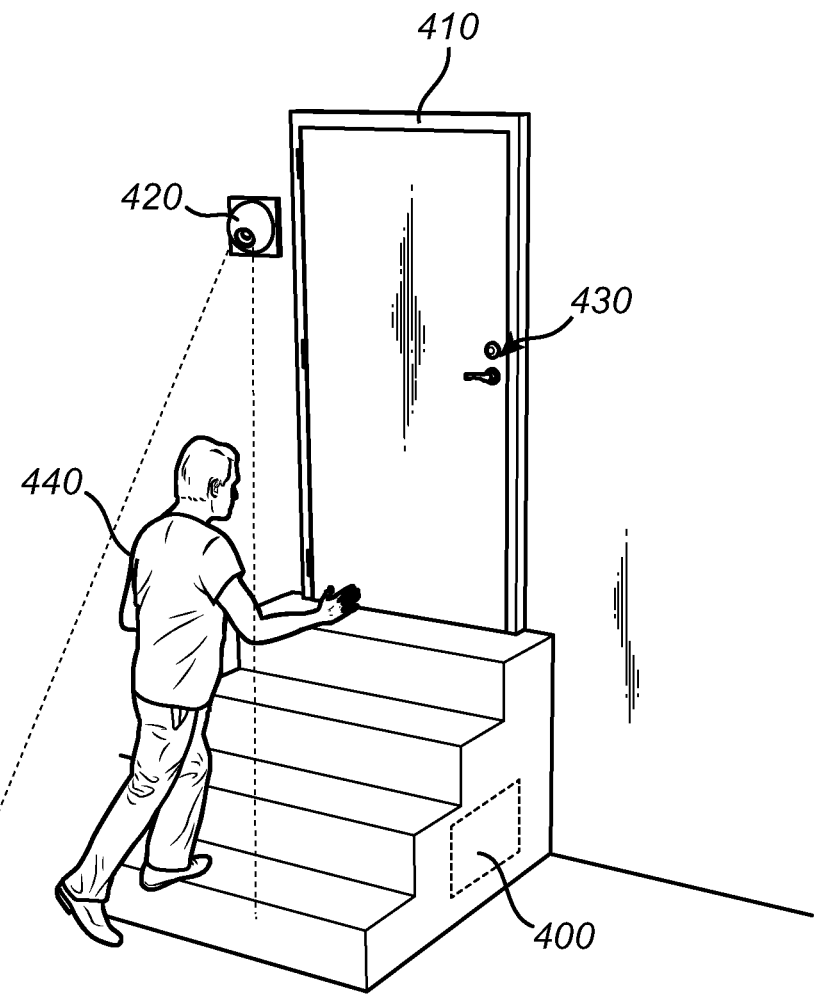
FIG. 4 is a schematic drawing illustrating an example scenario according to some embodiments.

FIG. 4 is a schematic drawing illustrating an example scenario according to some embodiments. In this scenario, a user 440 approaches a first biometric reader in the form of a camera 420 (compare with 230 of FIG. 2). Since the user approach is from a direction viewed by the camera 420 facial recognition circuitry comprised in a server node 400 (compare with 210 of FIG. 2) can recognize a first set of biometric data in the form of facial features of the user.

If the facial features matches previously acquired facial features of any of the users having access privileges, a second biometric reader in the form of a fingerprint sensor 430 (compare with 240 of FIG. 2) is unveiled or otherwise activated. The user may then touch the fingerprint sensor 430 to enable acquiring of a second set of biometric data in the form of fingerprint features of the user.

If the fingerprint features matches previously acquired fingerprint features of any of the users having access privileges, the door 410 may be unlocked and access to the physical domain behind the door is granted.

In an example scenario which may be associated with FIG. 4, a camera system may scan a surface to find facial features. The found facial features may be matched via a database to identify registered users. In this approach, the biometric data may be used anonymously and may serve as an index only. If no match is found the second biometric reader (e.g. fingerprint sensor) may be kept—mechanically or otherwise—unavailable to the user.

If a match is found, a database with features of the registered users may deliver a secure ID which is then used for matching in another database. When a match is found, the second level of the access control system may be made available and the user can be authenticated in response to a user action in relation to the second biometric reader. A notification may be presented to the user to indicate grant or denial of access.

The described embodiments and their equivalents may be realised in software or hardware or a combination thereof. The embodiments may be performed by general purpose circuitry.

Examples of general purpose circuitry include digital signal processors (DSP), central processing units (CPU), co-processor units, field programmable gate arrays (FPGA) and other programmable hardware. Alternatively or additionally, the embodiments may be performed by specialised circuitry, such as application specific integrated circuits (ASIC). The general purpose circuitry and/or the specialised circuitry may, for example, be associated with or comprised in an apparatus such as a server node.

Embodiments may appear within an electronic apparatus comprising arrangements, circuitry, and/or logic according to any of the embodiments described herein. Alternatively or additionally, an electronic apparatus (such as server node) may be configured to perform methods according to any of the embodiments described herein.

Figure 5:
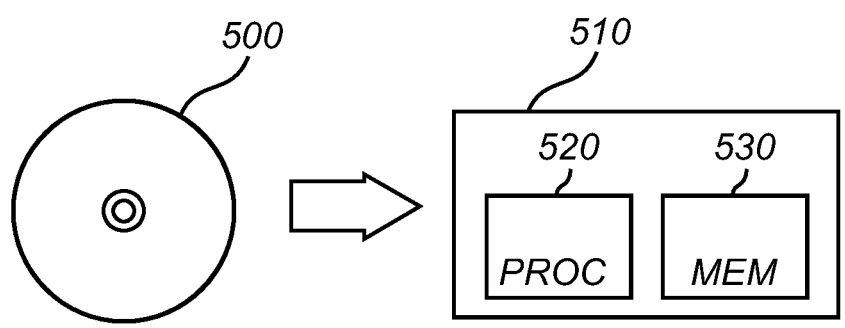
FIG. 5 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processing unit (PROC) 520, which may, for example, be comprised in a server node 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, the method illustrated in FIG. 1.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

What is claimed is:

1. A method for granting access for a user to a domain which is subject to an access restriction, wherein the user belongs to a group of one or more users having an access privilege in relation to the domain, the method comprising:

acquiring, via one or more first biometric readers, a first set of biometric data associated with the user, exclusively responsive to the user being in a vicinity of at least one of the first biometric readers;

performing a first identification of the user based on the first set of biometric data, wherein the first identification is successful if a comparison of the first set of biometric data to previously acquired first biometric data relating to the group of users, indicates that the user belongs to the group, wherein the previously acquired first biometric data is exclusively associated with the group of users;

acquiring, via one or more second biometric readers, a second set of biometric data associated with the user responsive to the first identification being successful;

performing a second identification of the user based on the second set of biometric data, wherein the second identification is successful if a comparison of the second set of biometric data to previously acquired second biometric data relating to the user indicates that the user has the access privilege; and granting access for the user to the domain at least responsive to the second identification being successful.

2. The method of claim 1 further comprising denying access for the user to the domain responsive to one or more of:
   the first identification being unsuccessful; and
   the second identification being unsuccessful.

3. The method of claim 1 wherein acquiring the first set of biometric data is automatically performed responsive to a determination that the user is in the vicinity of the at least one of the first biometric readers.

4. The method of claim 1 wherein the first biometric data comprises one or more of facial features, body features, motion features and gesture features.

5. The method of claim 1 wherein the one or more first biometric readers comprise one or more image capturing devices and circuitry configured to perform recognition of the first biometric data comprised in captures images.

6. The method of claim 1 wherein the comparison of the first set of biometric data to the previously acquired first biometric data indicates that the user belongs to the group if the first set of biometric data matches the previously acquired first biometric data for any of the users of the group.

7. The method of claim 1 wherein acquiring the second set of biometric data comprises activating the one or more second biometric readers responsive to the first identification being successful.

8. The method of claim 1 wherein acquiring the second set of biometric data is further responsive to the user actively providing the second set of biometric data.

9. The method of claim 1 wherein the second biometric data comprises one or more of fingerprint features, iris features and body area network features.

10. The method of claim 1 wherein the one or more second biometric readers comprise one or more of a fingerprint scanner, an iris scanner, and a body area network sensor.

11. The method of claim 1 wherein the previously acquired second biometric data is associated with respective user in the group of users.

12. The method of claim 1 wherein the comparison of the second set of biometric data to the previously acquired second biometric data indicates that the user has the access privilege if the second set of biometric data matches the previously acquired second biometric data for any of the users of the group.

13. The method of claim 1 wherein the comparison of the second set of biometric data to the previously acquired second biometric data comprises combining the second set of biometric data with the first set of biometric data and comparing the combined set of biometric data to the previously acquired second biometric data.

14. An arrangement for granting access for a user to a domain which is subject to an access restriction, wherein the user belongs to a group of one or more users having an access privilege in relation to the domain, the arrangement comprising a controller configured to cause:

acquiring, via one or more first biometric readers, of a first set of biometric data associated with the user, exclusively responsive to the user being in a vicinity of at least one of the first biometric readers;

performing of a first identification of the user based on the first set of biometric data, wherein the first identification is successful if a comparison of the first set of biometric data to previously acquired first biometric data relating to the group of users, indicates that the user belongs to the group, wherein the previously acquired first biometric data is exclusively associated with the group of users;

acquiring, via one or more second biometric readers, of a second set of biometric data associated with the user responsive to the first identification being successful;

performing of a second identification of the user based on the second set of biometric data, wherein the second identification is successful if a comparison of the second set of biometric data to previously acquired second biometric data relating to the user indicates that the user has the access privilege; and granting of access for the user to the domain at least responsive to the second identification being successful.

15. The arrangement of claim 14 wherein the controller is further configured to cause denying of access for the user to the domain responsive to one or more of:
   the first identification being unsuccessful; and
   the second identification being unsuccessful.

16. The arrangement of claim 14 wherein the controller is configured to cause acquiring of the first set of biometric data being automatically performed responsive to a determination that the user is in the vicinity of the at least one of the first biometric readers.

17. The arrangement of claim 14 wherein the controller is configured to cause acquiring of the second set of biometric data by activating the one or more second biometric readers responsive to the first identification being successful.

18. The arrangement of claim 14 wherein the controller is configured to cause acquiring of the second set of biometric data further responsive to the user actively providing the second set of biometric data.

19. A server node for granting access for a user to a domain which is subject to an access restriction comprising the arrangement of claim 14.

20. An access control system configured to grant access for a user to a domain which is subject to an access restriction, the system comprising:
   the server node of claim 19;
   the one or more first biometric readers;
   the one or more second biometric readers; and data storage configured to comprise the previously acquired first biometric data and the previously acquired second biometric data.

* * * * *